United States Patent [19]
Roundy et al.

[11] 3,710,218
[45] Jan. 9, 1973

[54] INDUCTION MOTOR SPEED CONTROL

[75] Inventors: Carlos B. Roundy, Stanford; John B. Riddle, Los Altos Hills; Ralph M. Heintz, Los Gatos, all of Calif.

[73] Assignee: Micro-Magnetic Industries, Inc.

[22] Filed: Oct. 8, 1970

[21] Appl. No.: 79,140

[52] U.S. Cl. .................318/231, 321/16, 307/220, 328/25
[51] Int. Cl. .....................H02p 5/34, H03b 19/00
[58] Field of Search ..........318/231; 321/16; 328/25; 307/220

[56] References Cited

UNITED STATES PATENTS

| | | | |
|---|---|---|---|
| 3,491,283 | 1/1970 | Johnston | 321/16 |
| 3,504,204 | 3/1970 | Carrive | 321/16 |
| 3,317,805 | 5/1967 | Kay | 318/231 |
| 3,355,647 | 11/1967 | Braus | 318/231 |
| 3,562,625 | 2/1971 | Broek | 321/16 |

*Primary Examiner*—Bernard A. Gilheany
*Assistant Examiner*—Thomas Langer
*Attorney*—Limbach, Limbach & Sutton

[57] ABSTRACT

The speed of an AC induction motor is controlled by regulating the frequency of the voltage applied to the stator. An improved frequency conversion circuit reduces the power line frequency to a lower desired frequency. The aforesaid induction speed control is suitable for use in any process or plant requiring the control of an AC induction motor, and is particularly useful in a pre-pay gasoline dispensing pump control system where a reduction in the pumping rate is required.

19 Claims, 44 Drawing Figures

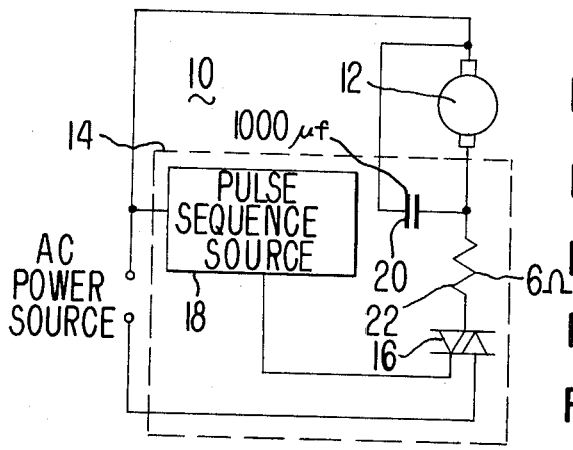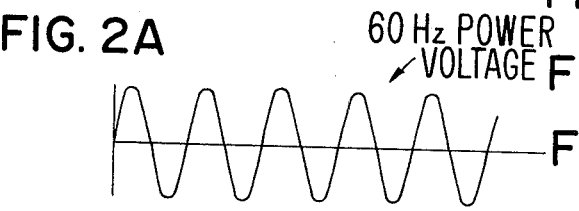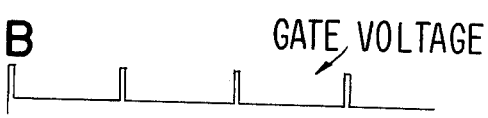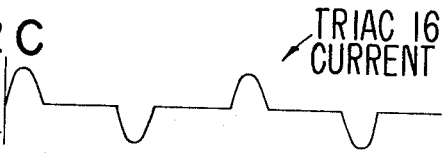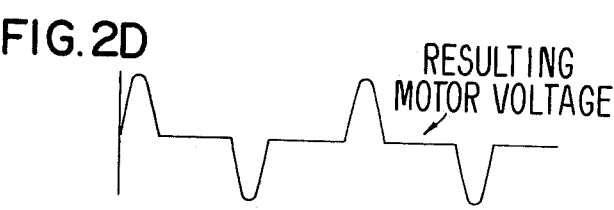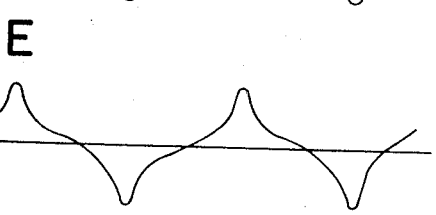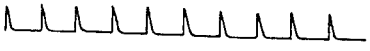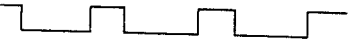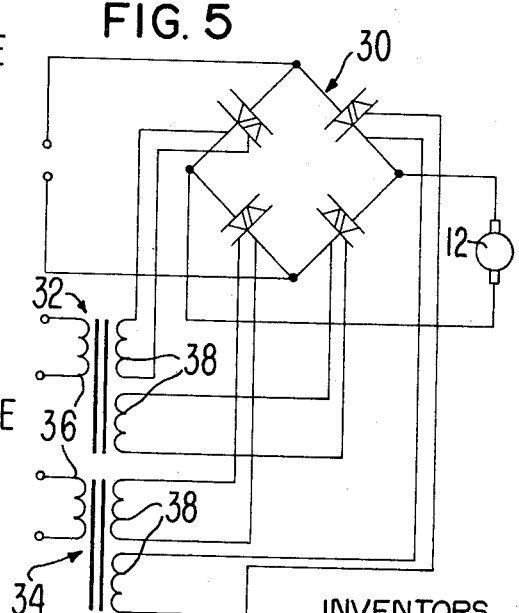

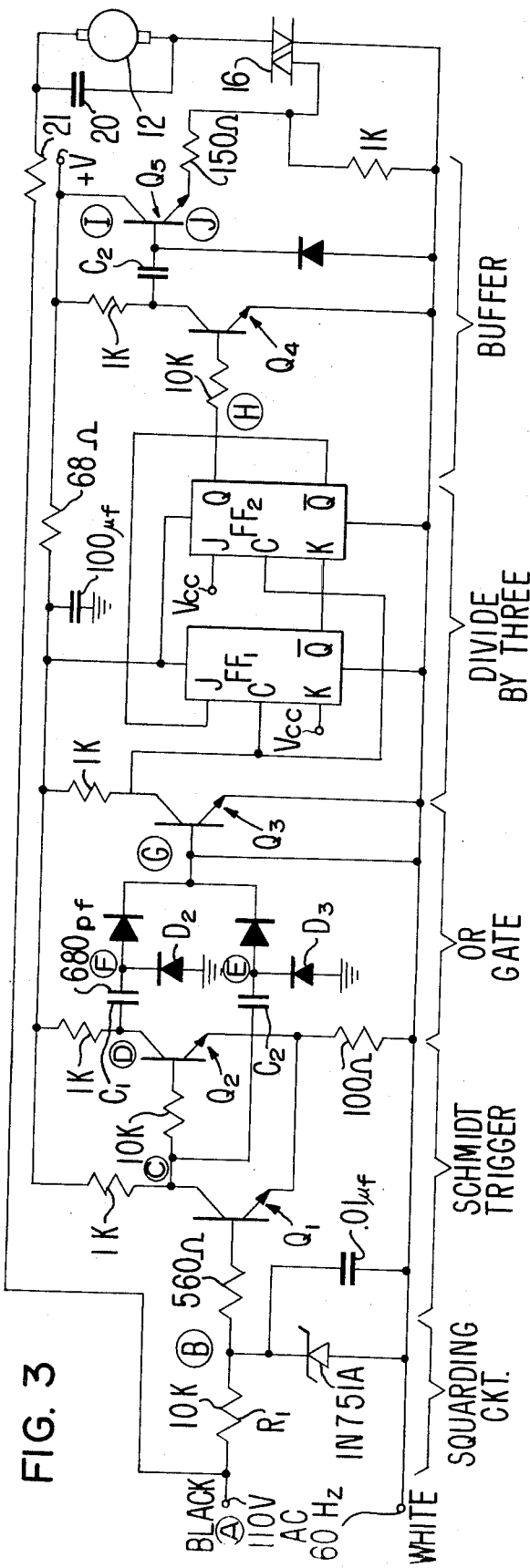

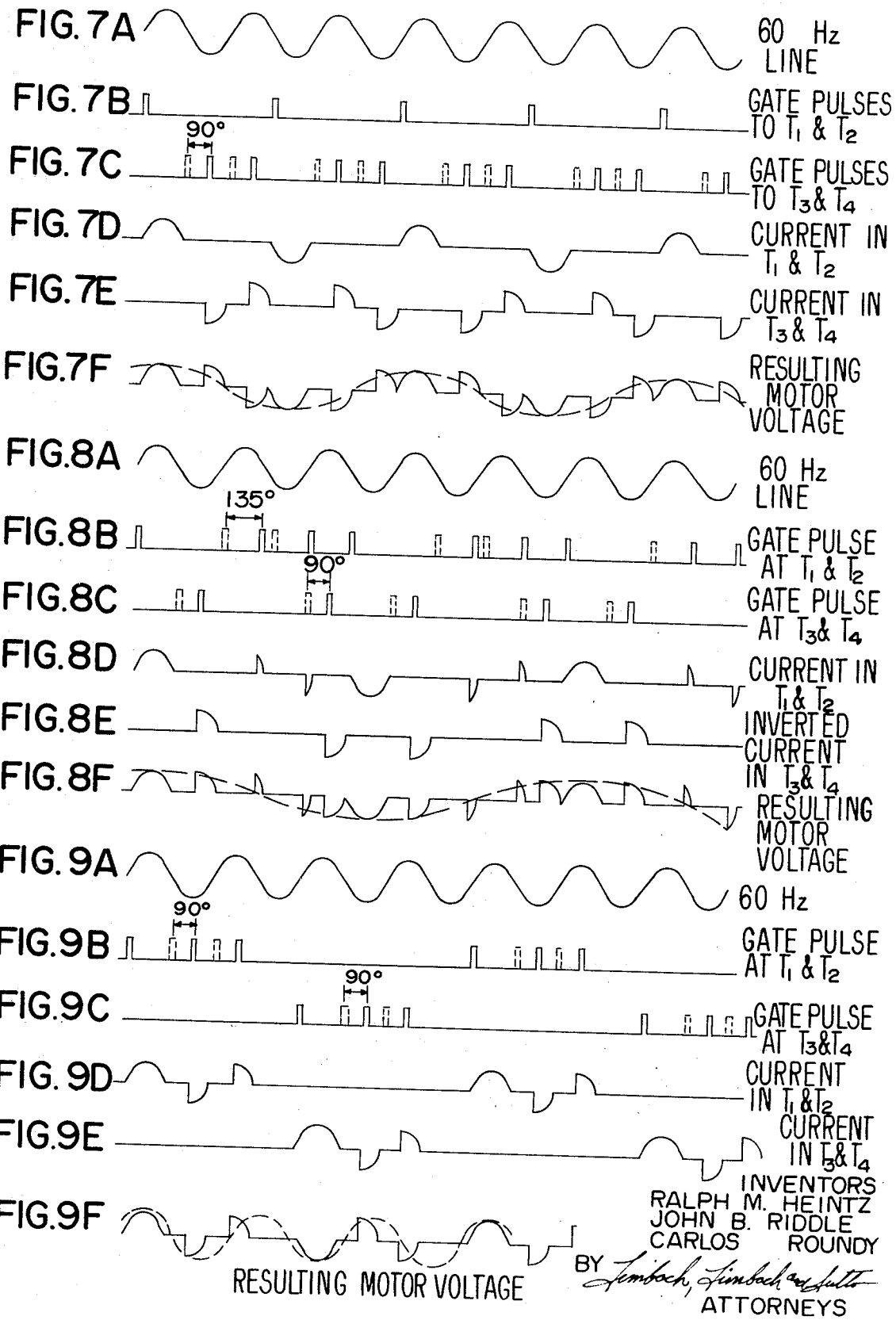

PATENTED JAN 9 1973

INVENTORS
ROBERT M. HEINTZ
JOHN B. RIDDLE
CARLOS ROUNDY
BY Limbach, Limbach and Sutton
ATTORNEYS

INDUCTION MOTOR SPEED CONTROL

BACKGROUND OF THE INVENTION

An AC induction motor is generally characterized as a relatively constant speed motor where the rotor speed is a fraction, typically around 0.8, of the synchronous stator frequency. Most efforts to control the speed of this type of motor have been directed to reducing the RMS voltage applied to the motor to thereby increase the slip. Unfortunately, this also has the effect of reducing the net torque of the motor.

In an AC induction motor the shaft rotational speed is proportional to the frequency of the voltage applied to the stator. Thus if one could conveniently convert the power line frequency, normally 60 Hz, to a lower frequency, the speed of an induction motor could be directly controlled by the application of different frequencies thereto.

One method now available for converting from a first frequency to a second frequency uses a rectifier for changing the 60 Hz line frequency to a direct current signal. Thereafter an inverter or chopper is used to convert the resulting DC to AC at the desired frequency. However, in this type of a frequency converter, it is necessary to have the intermediate step of converting the AC line voltage to DC. This requires the use of extra electronic components.

There have been attempts to convert the 60 Hz line voltage directly to a different frequency. Most of these circuits, however, have proven to be unreliable, overly complex and expensive.

The ability to control the speed of an AC induction motor is useful in many industrial applications. One specific application where such a motor control system is particularly useful is in the field of gasoline dispensing. More particularly, in a pre-pay, self-service gasoline pumping system, the amount of the gasoline which the customer can dispense into his car is determined in advance. Normally, this is done by an attendent or salesman. Once a customer has used up the predetermined credit, no further gasoline can be dispensed.

In a cash or credit, pre-pay, self-service system no attendant is required and cash or, for example, a credit card, is used to preset the gasoline pump. Pre-pay systems require some form of a presettable comparison register which is then decreased as gasoline is pumped. Also means must be provided to insure that the pump will cease delivery after exactly the predetermined amount has been dispensed with no more error than that allowed by existing weight and measure laws.

To insure that exactly the correct amount of gasoline is dispensed, the usual manner is to reduce the gasoline dispensing rate as the credit is nearly exhausted. Presently, the volume of flow of gasoline is reduced by providing an electromagnetically or solenoid-operated valve which must be physically installed in the gasoline pump nozzle. Examples of this approach as well as pre-pay gasoline systems in general, can be seen by reference to U.S. Pat. Nos. 3,459,330; 3,478,854; and 3,478,856.

The use of such a valve has serious drawbacks when it comes to modifying existing gasoline pump stations. Thus, if it is desired to modify a gasoline service station from an attended to a self-service, pre-pay system, it is necessary either to install a new pump with a solenoid-operated valve or to modify the existing pumps. The latter alternative, however, requires UL approval necessitating additional red tape and expense.

Virtually all of the gasoline pump motors presently in use are of the squirrel cage, AC induction motor type. Thus a simple and inexpensive frequency converter circuit which can be installed in the pump motor power line circuit without additional modification of the gasoline pump or pump motor would be extremely valuable in converting present gasoline service stations to self-service, prepay systems. When the amount of credit is nearly exhausted, it is simply a matter of reducing the frequency applied to the stator of the pump motor, thereby reducing the motor speed and decreasing the flow of the gasoline dispensed. This insures that when all of the credit is exhausted and the pump is turned off, the amount of the gasoline dispensed will fall within the limits prescribed by law.

Of course a highly reliable and inexpensive speed control system for an AC induction motor would have greater application in other areas besides gasoline dispensing. For example, in a plant or process utilizing one or more induction motors a feedback arrangement could be provided whereby in response to plant parameter changes, the speed of the induction motor or motors could be regulated.

SUMMARY OF THE INVENTION

The present invention relates to improved means for controlling the frequency of the voltage applied to the stator of an AC induction motor by using switching techniques; employing, for example, one or more solid state or silicon controlled switches commonly referred to as thyristors.

In accordance with one embodiment of the invention, a single triac or bi-directional switch is provided in series with the power source. By energizing the triac in a manner described subsequently, it is possible to divide the power source frequency by an odd integer. In accordance with the preferred embodiment voltage smoothing circuitry is provided to smooth the output voltage waveform.

In accordance with another aspect of the present invention a bridge network comprising solid state switches such as triacs are utilized to reduce the power source frequency by division by an even integer. The latter embodiment can be modified whereby the power source frequency can be reduced by division by non-integers and odd integers. The latter embodiment can be modified still further to provide an even smoother output waveform regardless of whether the division is by odd, even or non-integers.

BRIEF DESCRIPTION OF THE DRAWINGS

FIG. 1 is a schematic diagram of one embodiment of the present invention utilizing a single controlled switching element.

FIGS. 2A through 2E are graphical illustrations of waveforms found at various points during the operation of the circuit of FIG. 1.

FIG. 3 is a detailed schematic diagram of the embodiment shown in FIG. 1.

FIGS. 4A through 4K are graphical illustrations of waveforms found at various points in the circuit illustrated in FIG. 3.

FIG. 5 is another embodiment of the present invention utilizing a bridge comprising two pairs of solid state switching elements.

FIGS. 6A through 6F show the waveforms at various points of the circuit of FIG. 5 during one mode of operation of the circuit of FIG. 5.

FIGS. 7A through 7F illustrate waveforms found in the circuit of FIG. 5 when the circuit of FIG. 5 is operated in a second mode of operation.

FIGS. 8B through 8F illustrate waveforms found at various points of the circuit of FIG. 5 when operated in still another mode of operation.

FIGS. 9A through 9F illustrate waveforms at various points of the circuit of FIG. 5 when operated in another mode of operation.

BRIEF DESCRIPTION OF THE PREFERRED EMBODIMENTS

Figure 10A:
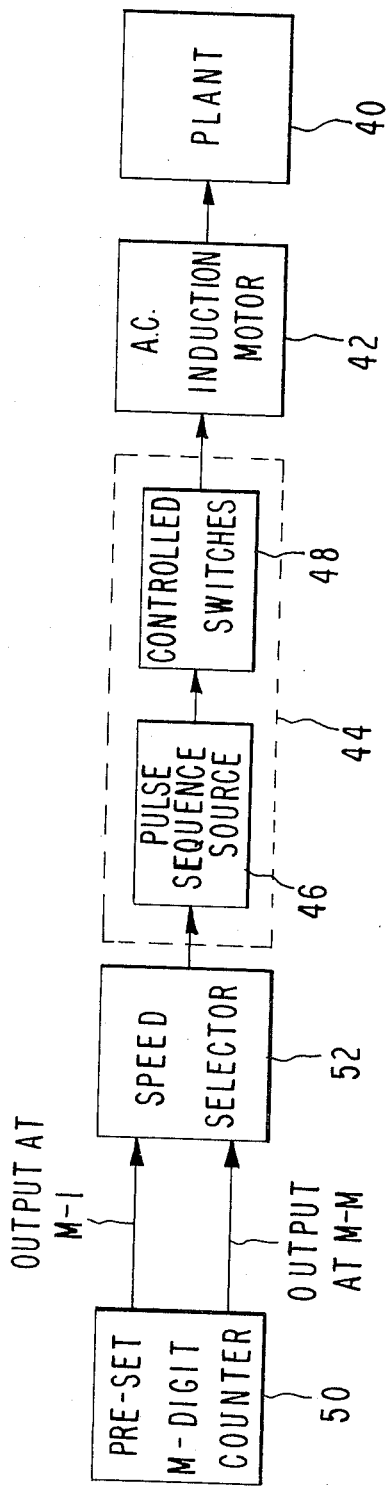
FIGS. 10A and 10B illustrate two generalized systems utilizing the present invention.

FIG. 1 illustrates a motor control system 10 utilizing the present invention. Connected to an AC power source is an AC induction motor 12 to be regulated. A frequency conversion circuit 14 is connected in the power source-stator circuit. It includes a triac 16 and a pulse sequence source 18.

A triac is one variety of a group of solid state controlled switches referred to generally as thyristors. It is a device similar to a silicon controlled retifier and is known variously as a bi-directional AC switch, symmetrical switch, five layer switch or bi-directional thyrister. The operating characteristics of a triac are the same as two SCR's connected in parallel in a direction opposite to one another. In operation, a triac conducts current in either a positive or negative direction when gated on. It automatically turns off at the next zero crossing of the current therethrough.

The operation of a triac should be contrasted with that of a silicon controlled rectifier (SCR). An SCR only passes current in one direction, whereas a triac passes current in both directions. Like a triac an SCR is turned off when the current through the SCR is reduced to zero. For further information about the characteristics and uses of SCR's and triacs, reference is made to the Feb., 1966 edition of "Electronics World," Volume 75, No. 2, pages 23–26.

The operation of the circuit of FIG. 1 is best seen by reference to FIGS. 2A through 2E. FIG. 2A illustrates the waveform of the 60 Hz AC power source applied at the input to the motor control circuit 10. In accordance with the present invention, the pulse sequence source 18 provides a predetermined gating sequence to the triac 16 in such a manner that the triac allows the passage of current therethrough only during prescribed portions of the 60 Hz line voltage waveform.

If it is desired to reduce the 60 Hz line voltage to 20 Hz, i.e., division by 3, the pulse sequence source provides the gating pulse waveform shown in FIG. 2B. The gate pulses in FIG. 2B are provided on every third passage through zero of the AC power voltage of FIG. 2A. In each instance that a gate signal is provided, the triac 16 is energized thereby allowing passage of current through the triac to the motor.

The triac 16 remains energized until the next passage of current through zero amps. This can be seen in FIG. 2C. The resulting voltage applied to the stator of motor 12 can be seen in FIG. 2D.

Note that the frequency of the voltage applied to the stator of the induction motor 12 has been reduced by a factor of 3, e.g. to 20 Hz. Thus frequency conversion, which can be utilized for controlling and reducing the speed of an AC induction motor is obtained by use of very simple circuitry. Further this form of frequency conversion provides precise speed control by digital frequency division.

Referring again to FIG. 1, voltage smoothing circuitry is provided as a part of the frequency conversion circuit 14. For purposes of illustration, a capacitor 20 and a resistor 22 form a simple RC smoothing network. Alternately an LC or other suitable smoothing circuit could be used during the period when the triac 16 is not conducting.

The effect of the smoothing circuit can be seen by reference to FIG. 2E. The capacitor 20 stores electrical charge for the motor 12 between triac conducting cycles. A resistor 22 reduces the peak current so that the RMS motor voltage is about one-third the line voltage.

With the aforesaid motor control system torque is maintained at the lower frequency. This latter result may be explained as follows. The torque provided by an AC induction motor is a function of the root-mean-square voltage applied to it. To maintain constant torque at a lower frequency, one must increase the peak current available during the induction periods. However, this is automatically accomplished in the present invention since the peak current increases at the lower frequency because of the reduction of impedance at the lower frequency. Hence the overall result is that the torque remains substantially constant.

Although division of the AC power voltage by 3 is shown in FIGS. 1 and 2, it should be understood that the same principle may be used to divide by any odd integer. For example, if one wishes to obtain a frequency conversion from 60 Hz to 12 Hz, e.g. division by 5, rather than gate triac 12 every third zero crossing of the line voltage, triac 16 is gated every fifth zero crossing. Similarly, to divide by 7 the triac is gated every seventh zero crossing, etc.

Note that the circuit illustrated in FIGS. 1 and 2 provides only division of the line frequency by odd integers. Of interest also is the fact that no quenching of the triac is required since it is automatically turned off at the end of every half cycle of the 60 Hz power.

A detailed circuit diagram of one form of the pulse sequence source 18 is illustrated in FIG. 3 for providing a gate pulse to the triac 16 on every third zero crossing; providing a 20 Hz output in the case of a 60 Hz line voltage input. The pulse sequence source 18 includes five basic parts, a squaring circuit, Schmitt trigger, OR gate, divide-by-3 circuit and a buffer. The waveforms generated at various points in the circuit of FIG. 3, indicated by encircled letters A through J, are illustrated in FIGS. 4A through 4K.

In the particular embodiment illustrated, the squaring circuit comprises a resistor R1 and a zener diode D1 which clips the 60 Hz power sine wave to form a relatively square wave output as shown in FIG. 4B. The Schmitt trigger circuit is regenerative and comprises transistors Q1 and Q2. This circuit provides a very fast rise time in response to the output of the squaring circuit. The output from the squaring gate is inputed to the OR gate which includes two diodes, D3 and D4, which are connected respectively to the collector and base circuit of the transistor Q2. It may be seen by reference to FIGS. 4C and 4D that these signals are 180° out-of-phase with one another. Capacitors C1 and C2 convert the square wave of FIGS. 4C and 4D into sharp spikes as shown in FIGS. 4E and 4F. The sharp spiked signals of FIGS. 4E and 4F are transmitted to the base of transistor Q3 every zero crossing of the input 60 Hz waveform. The resulting clock signals are shown in FIG. 4G.

Division by 3 is accomplished by the divide-by-3 circuit which includes two flip flips FF1 and FF2 which are connected in a conventional manner to provide an output pulse for every third input pulse. The final stage, the buffer stage, includes an amplifying transistor Q4 and differentiator C2 which provides a positive gate pulse to triac 16 every third zero crossing of the 60 Hz line voltage, as shown in FIGS. 4I and 4J. This results in the triac 16 being energized at the beginning of every third zero crossing as shown in FIGS. 2D and 2E. Thus the motor 12 is receiving a 20 Hz signal and the speed of the motor is reduced by a factor of 3.

Using a bridge network 30 of thyristors, such as triacs T1 through T4 shown in FIG. 5, a number of refinements in the operations of the circuit of FIG. 1 can be obtained. In particular, the bridge circuit 30 may be used to divide the AC power voltage by even integers, i.e., by 2, 4, 6 etc.; provide smoothing of the voltage waveforms in the case of division by either even or odd integers; and also to divide by non-integers, particularly between non-integers between one and two.

Each of the triacs T1 through T4 is gated through transformers 32 and 34 comprising primary windings 36 and secondary windings 38. Transformer coupling is provided since there is no common ground among triacs T1 through T4. Note that the triacs are paired such that triacs T1 and T2 and T3 and T4 are operated together in the same mode.

The gating pulses provided at the primary windings 36 come from a circuit similar to that shown in FIG. 3. However the circuit of FIG. 3 must be modified to the extent that the divide-by-3 circuit be altered to divide by the desired number. For example, if it is desired that the speed of the motor 12 be reduced by one half it is necessary to reduce the 60 Hz power frequency by 2. Thus the divide circuit would be modified, in a manner well known to those skilled in the art, to divide by 2 rather than 3. While details of the smoothing circuit and other details of the motor control circuit have been omitted in FIG. 4, it should be understood they would normally be included in the preferred embodiment.

Operation of the circuit of FIG. 5 can best be understood by reference to the waveforms shown in FIGS. 6A through 6F. FIG. 6A illustrates the 60 Hz line waveform and FIGS. 6B and 6C illustrate the gate pulses which are provided respectively to the gates of triacs T1 and T2 and T3 and T4 via the transformers 32 and 34 respectively, for a frequency conversion of 60 Hz to 30 Hz, i.e., division by 2. Again it should be understood that the reduction in speed by a factor of 2 is only illustrative and the present invention is also applicable to other speed reductions.

In operation, with gate pulses to triacs T1 and T2 as the 60 Hz voltage begins to go positive, a current path is provided from the power source through triac T1, through the stator windings of the motor 12, through the triac T2 and return to the power source. Triacs T1 and T2 then conduct until the next passage through zero of the 60 Hz line voltage. This is illustrated in FIG. 6D.

With the second passage of the 60 Hz line voltage through zero, i.e., when the negative voltage goes positive, a gate pulse, shown in FIG. 6C, is given to triacs T3 and T4. Since the 60 Hz waveform is going positive at that point, the current flows through the motor 12 in a direction opposite of that when it previously passed through the triacs T1, motor 12, and T2.

The current through triacs T3 and T4 is shown in FIG. 6O and the resulting motor voltage waveform shown in FIG. 6F. Note that the effect of the bridge circuit is that the alternate positive waveforms of the 60 Hz power voltage are inverted at the time that they are applied to the motor 12. The dotted line shown in FIG. 6F illustrates the approximated resulting waveform. Its frequency is one-half that of the 60 Hz line frequency.

In a similar manner division by 4, 6, or any other even integer can also be achieved by simply altering the triac gating sequence from every other zero voltage crossing to every fourth, sixth, etc. zero voltage crossing. Again, referring to the circuit of FIG. 3, this simply means altering the division portion of that circuit to provide the desired division rate whether it be by 2, 4, 6 etc. Such as alteration of FIG. 3 can be done by any person skilled in the digital art.

The bridge circuit of FIG. 5 can be used to reduce the 60 Hz line voltage by division by odd integers as well as even integers. This can be accomplished by always triggering the same pair of triacs, i.e., T1 and T2 or T3 and T4 in the bridge network, at an appropriate odd-numbered zero crossing sequence. For example, by gating only the triacs T1 and T2 every third zero crossing of the line voltage, the voltage applied to the motor will be 20 Hz, e.g., frequency division by 3.

By modifying the gate pulse sequence to triacs T1-T4 in the bridge 30 of FIG. 5, it is possible to deliver a smoother, more uniform voltage waveform to the motor 12. This is accomplished by selectively gating the pairs of triacs and by delaying the gate pulses at appropriate points in the gate circuit. Referring to FIGS. 7A through 7F, by gating triacs T3 and T4 twice for every gate of triacs T1 and T2 and by delaying the T1 and T2 gate pulses approximately 90° from their normal position at the zero crossing (indicated by the pulses in dotted lines), the resulting currents shown in FIGS. 7D and 7E through the triacs T1 and T2, and T3 and T4 are obtained. Since the voltage applied to the motor 12 is inverted with respect to the current through the triacs T3 and T4 the resulting motor voltage appears as shown in FIG. 7E and has a resulting voltage envelope approximated by the dotted line.

The effect of the delay of the gate pulses is to energize the triacs T3 and T4 for less than the full 180° of the line voltage. It may be seen by reference to FIG. 7F that this has the effect of "filling in" the waveform to thereby provide a more uniform waveform than otherwise possible. Again note that since the last part of each 60 Hz half cycle is utilized no quenching of the triacs is necessary.

Another illustration of the additional smoothing which can be provided by the bridge circuit of FIG. 5 is shown in FIGS. 8A–8F. Here, frequency division by 5 is performed which provides 12 Hz voltage to the motor in the case of the usual 60 Hz AC power source voltage. FIGS. 8B and 8C show the gating sequence to the T1–T2 pair and T3–T4 pair of triacs. Note that a delay of 135° is required for some of the gate pulses to the triacs T1 and T2 and 90° delay for the gate pulses to triacs T3 and T4.

The current through triacs T1 and T2 is shown in FIG. 8D and the inverted current in triacs T3 and T4 in FIG. 8E. The resulting motor voltage is shown in FIG. 8F. The dotted line illustrates the resultant voltage envelope. It can be seen that this waveform is smoother than that which is obtained with the divide by 5 circuit of the type shown in FIGS. 1 and 3.

By pulsing the triacs T1 through T4 in the manner shown in FIGS. 9B and 9C, division by a non-integer is obtained as shown in FIG. 9F. The resulting frequency shown in FIG. 9F is three-quarters of that of the line frequency or frequency division by four-thirds. The currents through the respective triacs is shown in FIGS. 9D and 9E.

Note that with the bridge circuit of FIG. 4 additional smoothing can be achieved by the use of an RLC, or LC, or other suitable smoothing network described with respect to FIGS. 1 and 3.

There are any number of ways, all well known to those skilled in the art, to provide the gate pulse delays necessary for the embodiments illustrated in FIGS. 7 through 9. For example, the gate pulses could be sent through a one-shot multivibrator with a time constant corresponding to the desired length of the delay.

The present invention should not be limited to the particular frequency reductions illustrated in the aforesaid described embodiments. These circuits can easily be modified to provide an entire range of motor speeds. It is simply a matter of determining the proper firing sequence of the triac or triacs to synthesize a voltage envelope at the frequency required in the particular application.

As pointed out previously, the present motor speed control can be used in any plant or process utilizing AC induction motors. With reference to the generalized system of FIG. 9A, a plant 50 includes one or more AC induction motors 42 used in the operation of the plant or process. A power frequency converter 44 converts the 60 Hz line voltage to the desired frequency depending on the desired speed of operation of the induction motor 42.

The power frequency converter 44 is formed from one of the previously described embodiments or combinations thereof. It includes a pulse sequence source 46 and one or more solid state controlled switches 48. The pulse sequence source 46 is designed to provide the gate pulse sequence, including pulse delays, necessary for gating the controlled switches 45 to provide the particular speed required by the plant 40.

For example, if plant 40 requires only two speed motor operations, the embodiment of FIGS. 1 and 3 can be used and the pulse sequence source 46 would comprise the circuit 18 of FIG. 3.

If more motor speeds are required, the pulse sequence source 46 would be more complex. Notwithstanding the latter, the design and operation of the pulse sequence source 46 would require only obvious modifications in the circuit 18 of FIG. 3.

A preset M-digit counter 50 provides an output pulse signal at up to M digits of the counter, as the counter is counted down. The speed selector 52 in response thereto provides signals to the power frequency converter 44 to change the pulse sequence source to provide the desired induction motor speeds.

The generalized system of FIG. 10A includes the specific application of the present invention in a prepay, self-service, gasoline dispensing system. In the usual pre-pay system, as exemplified by the aforesaid prior art patents, the pre-set, M-digit counters 50 correspond to some type of a presettable register or counter which records the amount of credit deposited by the customer. The comparison register is counted down as the gasoline is dispensed. When there is a predetermined amount of credit remaining, a signal is provided to the speed selector 52 to provide the gate pulse sequence to reduce the 60 Hz frequency to a lower frequency, thereby slowing down the gasoline pump motor as desired. When the register is counted down to zero, a signal is provided to shut down the pump motor. Typically, a frequency reduction to 20 Hz is satisfactory to reduce the speed of the pump motor to a level sufficient to insure that the pump motor will stop within a sufficiently short period of time to insure that the proper amount of gasoline is pumped.

As an alternate to counting down the register, a second register or counter may be provided which adds up the gasoline as it is dispensed. When the amount counted up is within a predetermined amount of the total gasoline to be dispensed, the motor slowdown signal is given. When the second counter reaches the value of the first counter, a signal is sent to turn off the pump motor.

Figure 10B:
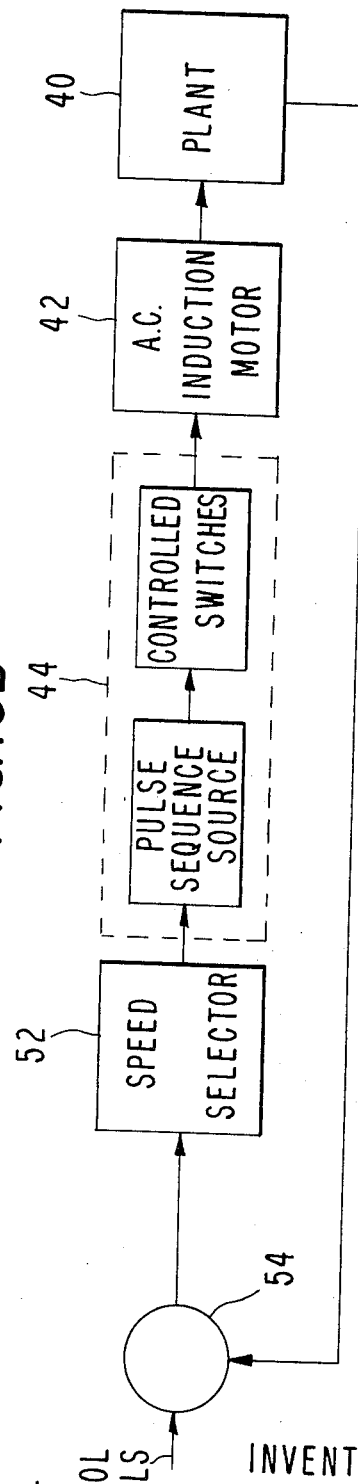

FIG. 10B illustrates the application of the present invention in a plant having feedback arrangement. Sensors located in the plant 40, in response to changes in plant parameters, send a signal back to a summing junction 54 where they are compared with plant control signals and, where necessary, to effect a speed change via the speed selector 52.

The aforesaid frequency conversion system and motor speed control has several advantages over prior art systems. First, simple triac circuitry is used in which no quenching of the triacs during a conducting period is required. Second, simple digital means are used to obtain the gate pulses to trigger the triacs used. Thus, precise motor speeds can be obtained inexpensively and reliably at below normal operational speeds.

While one specific embodiment of the invention has been illustrated and described in detail herein, it is obvious that many modifications thereof may be made without departing from the spirit of the invention as described in the appended claims.

We claim:

1. Motor speed control circuit for reducing the speed of an AC induction motor comprising:
   a. a solid state switching element connected between an AC power source and the AC induction motor being controlled;
   b. means for selectively energizing said switching element to either a high conductivity or substantially non-conducting state to provide a resulting voltage waveform to said AC induction motor having a frequency lower than the AC power source;

c. said energizing means including means for driving said switching element to a high conduction state for periods of substantially one-half cycle of the AC power source, thereby providing an electrical path between said AC power source and said AC induction motor during said periods; and d. said energizing means additionally including means for driving said switching element to a high conduction state only during said half cycle conduction periods beginning approximately every nth zero voltage crossing of the AC power source, where $n$ is an odd integer larger than one, so that alternate positive and negative waveforms are provided to said AC induction motor from said AC power source at a resulting frequency of $1/n$th of that of the AC power source.

2. Motor speed control circuit as in claim 1 including a voltage smoothing circuit connected therein.

3. Motor speed control circuit as in claim 2 wherein said solid state switching device comprises a triac.

4. Motor speed control circuit as in claim 3 wherein $n$ is three.

5. Motor speed control circuit as in claim 3 wherein $n$ is five.

6. Motor speed control circuit as in claim 2 wherein said solid state switching device comprises a pair of SCR's connected in parallel, and opposite to each other.

7. Motor speed control circuit for reducing the speed of an AC induction motor comprising:

a. first solid state switching means connected between an AC power source and the AC motor being controlled, b. second solid state switching means connected between the AC power source and the AC motor being controlled;

c. means for alternatively energizing said first and second solid state switching means between high and low conduction states;

d. said energizing means including means for driving alternate ones of said first and second switching means to the high conduction state for periods of substantially one-half cycle of the AC power source, thereby providing alternate paths between said AC power source and said AC induction motor during said periods;

e. said energizing means additionally including means for alternately driving said first and second switching means to a high conduction state only during those half cycle conduction periods beginning every mth zero voltage crossing of the AC power source, where m is an even integer; and f. wherein said second switching means includes means for inverting the voltage applied to said motor so that alternate positive and negative waveforms are provided to said AC induction motor from said AC power source at a resulting frequency of $1/m$th of that of the AC power source.

8. Motor speed control circuit as in claim 1 wherein said first switching means comprises a first pair of silicon controlled switching elements forming one half of a bridge circuit, and said second switching means comprises a second pair of silicon controlled switching elements forming the second half of said bridge circuit.

9. Motor speed control circuit as in claim 8 wherein said first and second pairs of silicon controlled switching elements comprise triacs.

10. Motor speed control circuit as in claim 9 including a voltage smoothing circuit connected therein.

11. Motor speed control circuit as in claim 8 wherein m is the integer two.

12. Motor speed control circuit as in claim 8 wherein $m$ is the integer 4.

13. A method of converting an AC power voltage waveform to a lower frequency comprising the steps of: connecting a solid state switching element between an AC power source and a load; and energizing said solid state switching element for substantially one-half cycle of the AC power source beginning approximately every $n$th zero voltage crossing of the AC power source, where $n$ is an odd integer larger than one, and wherein the resulting AC voltage waveform provided to said load has a frequency of $1/n$the of that of the AC power source.

14. The method of claim 44 including the additional step of smoothing the resulting voltage waveform.

15. Power frequency converter for reducing the frequency of an AC power source comprising:

a. first and second solid state switching means connected with the AC power source;

b. means for alternatively energizing said first and second solid state switching means between high and low conduction states;

c. said energizing means including means for driving alternate ones of said first and second switching means to the high conduction state for periods of substantially one-half cycle of the AC power source, thereby providing alternate paths between said AC power source and said AC induction motor during said periods;

d. said energizing means additionally including means for alternately driving said first and second switching means to a high conduction state only during those half cycle conduction periods beginning every mth zero voltage crossing of the AC power source, where m is an even integer; and e. wherein said second switching means includes means for inverting the voltage applied to said motor so that alternate positive and negative waveforms are provided to said AC induction motor from said AC power source at a resulting frequency of $1/m$th of that of the AC power source.

16. Power frequency converter as in claim 15 wherein said first switching means comprises a first pair of silicon controlled switching elements forming one half of a bridge circuit, and said second switching means comprises a second pair of silicon controlled switching elements forming the second half of said bridge circuit.

17. Power frequency converter as in claim 15 wherein said first and second pairs of silicon controlled switching devices comprise triacs.

18. Power frequency converter as in claim 15 wherein m is the integer two.

19. Power frequency converter as in claim 15 including a voltage smoothing circuit connected therein.

* * * * *